(12) United States Patent
Yuan et al.

(10) Patent No.: US 8,189,035 B2
(45) Date of Patent: May 29, 2012

(54) METHOD AND APPARATUS FOR RENDERING VIRTUAL SEE-THROUGH SCENES ON SINGLE OR TILED DISPLAYS

(75) Inventors: Chang Yuan, Vancouver, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 964 days.

(21) Appl. No.: 12/079,768

(22) Filed: Mar. 28, 2008

(65) Prior Publication Data

US 2009/0244267 A1    Oct. 1, 2009

(51) Int. Cl.
*H04N 13/04* (2006.01)
(52) U.S. Cl. ............................................. 348/51; 348/52
(58) Field of Classification Search .................. None
See application file for complete search history.

(56) References Cited

U.S. PATENT DOCUMENTS

| | | | |
|---|---|---|---|
| 5,572,343 A | 11/1996 | Okamura et al. | |
| 6,417,880 B1 * | 7/2002 | Uomori et al. | 348/42 |
| 6,597,346 B1 | 7/2003 | Havey et al. | |
| 7,190,518 B1 * | 3/2007 | Kleinberger et al. | 359/465 |
| 7,199,934 B2 | 4/2007 | Yamasaki | |
| 2002/0113756 A1 * | 8/2002 | Tuceryan et al. | 345/8 |
| 2004/0070611 A1 | 4/2004 | Tanaka et al. | |
| 2004/0196359 A1 * | 10/2004 | Blackham | 348/14.08 |
| 2005/0044500 A1 * | 2/2005 | Orimoto et al. | 715/706 |
| 2006/0028400 A1 | 2/2006 | Lapstun et al. | |
| 2008/0204549 A1 * | 8/2008 | Horimai et al. | 348/51 |
| 2009/0001251 A1 * | 1/2009 | Ng et al. | 250/205 |
| 2009/0322860 A1 * | 12/2009 | Zhang et al. | 348/46 |

OTHER PUBLICATIONS

Point Grey Research, "Bumble Bee 2 stereo vision camera," http://www.ptgrey.com/products/bumblebee2/bumblebee2_xb3_datasheet.pdf, last accessed on Dec. 13, 2007.

* cited by examiner

*Primary Examiner* — John B. Walsh
(74) *Attorney, Agent, or Firm* — Chernoff Vilhauer McClung & Stenzel, LLP

(57) ABSTRACT

A system for displaying an image on a display includes a display for displaying an image thereon. A three dimensional representation of an image is obtained. The three dimensional representation is rendered as a two dimensional representation on the display. An imaging device is associated with the display. The location of a viewer is determined with respect to the display. The rendering on the display is based upon the determining the location of the viewer with respect to the display.

21 Claims, 11 Drawing Sheets

CONTENT INDEPENDENT

CONTENT DEPENDENT

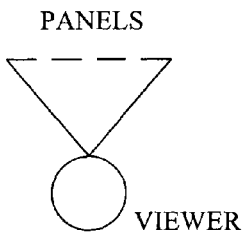 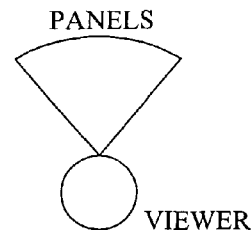 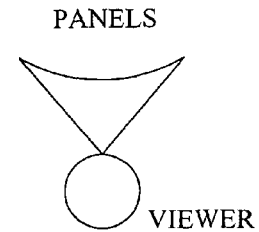
FIG. 10A   FIG. 10B   FIG. 10C
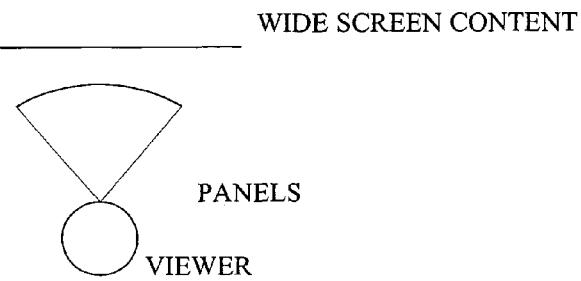
FIG. 11
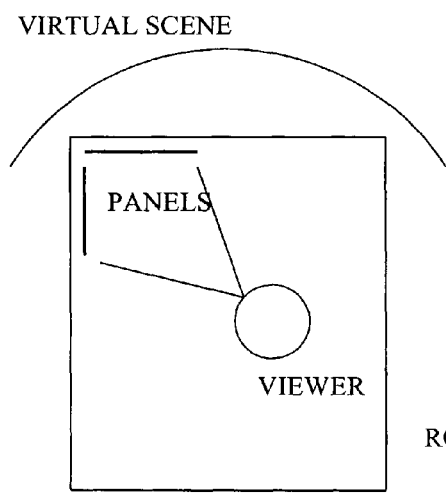 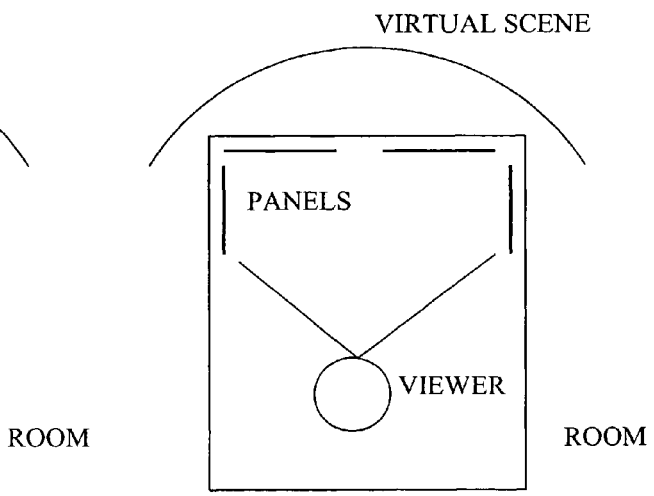
FIG. 12A   FIG. 12B

METHOD AND APPARATUS FOR RENDERING VIRTUAL SEE-THROUGH SCENES ON SINGLE OR TILED DISPLAYS

CROSS-REFERENCE TO RELATED APPLICATIONS

Not applicable.

BACKGROUND OF THE INVENTION

The present invention relates to displaying images on a display.

Flat panel display systems have become increasingly popular in recent years, due to their relatively high image qualities, relatively low power consumption, relatively large available panel sizes, and relatively thin form factors. A single flat panel can reach as large as 108 inches or greater diagonally, although they tend to be relatively expensive compared to smaller displays. Meanwhile, an array of relatively less expensive smaller panels can be integrated together to form a tiled display, where a single image is displayed across the displays. Such tiled displays utilize multiple flat panels, especially liquid crystal display (LCD) panels, to render the visual media in ultra-high image resolution together with a wider field of view than a single panel making up the tiled display.

Conventional display technologies, however, can only render visual media as if it was physically attached to the panels. In this manner, the image is statically displayed on the single or tiled panels, and appears identical independent of the position of the viewer. The "flat" appearance on a single or tiled panel does not provide viewers with a strong sense of depth and immersion. Furthermore, if the panel is moved or rotated, the image rendered on that panel is distorted with respect to a viewer that remains stationary, which deteriorates the visual quality of the display.

Stereoscopic display devices are able to render three dimensional content in binocular views. However, such stereoscopic displays usually require viewers either to wear glasses or to stay in certain positions in order to gain the sense of three dimensional depth. Furthermore, the image resolution and refresh rate are generally limited on stereoscopic displays. Also, stereoscopic display devices need to be provided with true three dimensional content, which is cumbersome to generate.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 10A-10C illustrate different geometric shapes for a tiled display.

FIG. 11 illustrates rending wide screen content on a curved tiled display.

FIGS. 12A and 12B illustrate tiled display fitted within a room.

DETAILED DESCRIPTION OF PREFERRED EMBODIMENT

Figure 1:
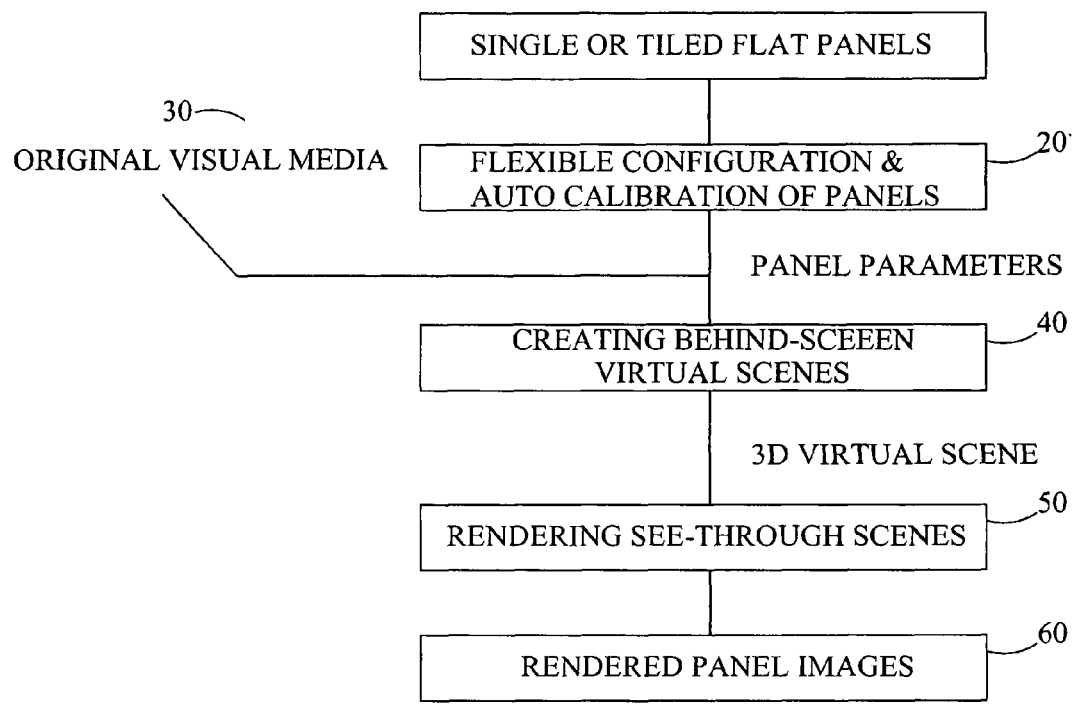
FIG. 1 illustrates an overall pipeline of a rendering technique.

As opposed to having an image that is statically displayed on a panel, it is desirable to render the visual media in a virtual scene behind the flat panels, so that the viewers feel they are seeing the scene through the panels. In this manner, the visual media is separated from the flat panels. The display system acts as "French windows" to the outside virtual scene, leading to a so called "see-through" experience.

Although the display system renders only two dimensional views, the viewers can still gain a strong sense of immersion and the see-through experience. When the viewer moves, he/she may observe the scene move in the opposite direction, varying image perspectives, or even different parts of the scene. If there are multiple depth layers in the scene, the viewers also observe 2D motion parallax effects that bring additional sense of depth to them.

In order to generate the "see-through" experience, the display system may create and render a virtual scene behind the panels. If the original visual media is two dimensional, it can be converted to three dimensional structures. The 3D visual media is then transformed to a 3D space behind the panels, thereby creating a virtual scene to be observed by viewers. The rendering of the scene on the display is modified based upon the viewers' head and/or eye positions (e.g., locations), as the viewers may move freely in front of the display. In order to determine the position of the viewer, one or more cameras may be mounted to the panel, or otherwise integrated with the panel, to track the viewers' head and/or eyes in real time. The imaging system may further track the location of the gaze of the viewer with respect to the panel. A set of virtual 3D optical rays are assumed to be projected from the virtual scene and converge at the viewers' head and/or eye position(s). The image pixels rendered on the panels are the projection of these optical rays onto the panels. The color for each pixel on the panels is computed by tracing the optical rays back into the virtual scene and sampling colors from the virtual scene.

Since the virtual scene with different depth layers is separated from the panels, the configuration of the panels is flexible, including geometric shapes and display parameters (e.g. brightness and color). For example, the position, the orientation, and the display parameters of each panel or "window" may be changed independently of one another. In order to generate a consistent experience of seeing through the flat panel surfaces, the system should automatically calibrate the panels and modify parameters. This technique may use a camera placed in front of the display to capture the images displayed on the panels. Then the 3D position, the orientation, the display settings, and the color correction parameters may be computed for each panel. Thereafter, the rendered images are modified so that the rendered views of the virtual scene remain consistent across the panels. This calibration process may be repeated when the panel configuration is changed.

A technique for providing a dynamic 3D experience together with modification based upon the viewer's location facilitates a system suitable for a broad range of applications. One such application is to generate an "adaptive scenic window" experience, namely, rendering an immersive scenic environment that surrounds the viewers and changes according to the viewers' motion. The display system may cover an entire wall, wrap around a corner, or even cover a majority of the walls of an enclosed room to bring the viewers a strong sense of immersion and 3D depth. Another application is to compensate for the vibration of display devices in a dynamic viewing environment, such as buses and airplanes. As the viewers and display devices are under continuous vibrations in these environments, the visual media rendered on the display may make the viewers feel discomfort or even motion sickness. With the real-time viewer tracking and see-through rendering functionalities, the visual media may be rendered virtually behind the screen with a synthetic motion synchronized with the vibration, which would then appear stabilized to the viewer. The discomfort in watching vibrating displays is thus reduced.

The overall pipeline of the technique is illustrated in FIG. 1. It starts by an optional step of flexible configuration and automatic calibration of panels 20. The configuration and calibration step 20 can be omitted if the geometric shape and display parameters of flat panels are already known and do not need to be modified. Based on the calibration results 20, the original visual media (2D media may be converted to 3D structures) 30 is transformed for creating a virtual scene behind the panels 40. The see-through experience occurring at the display 60 is generated by rendering the virtual scene 50 according to the tracked viewers' eye positions.

Figure 2:
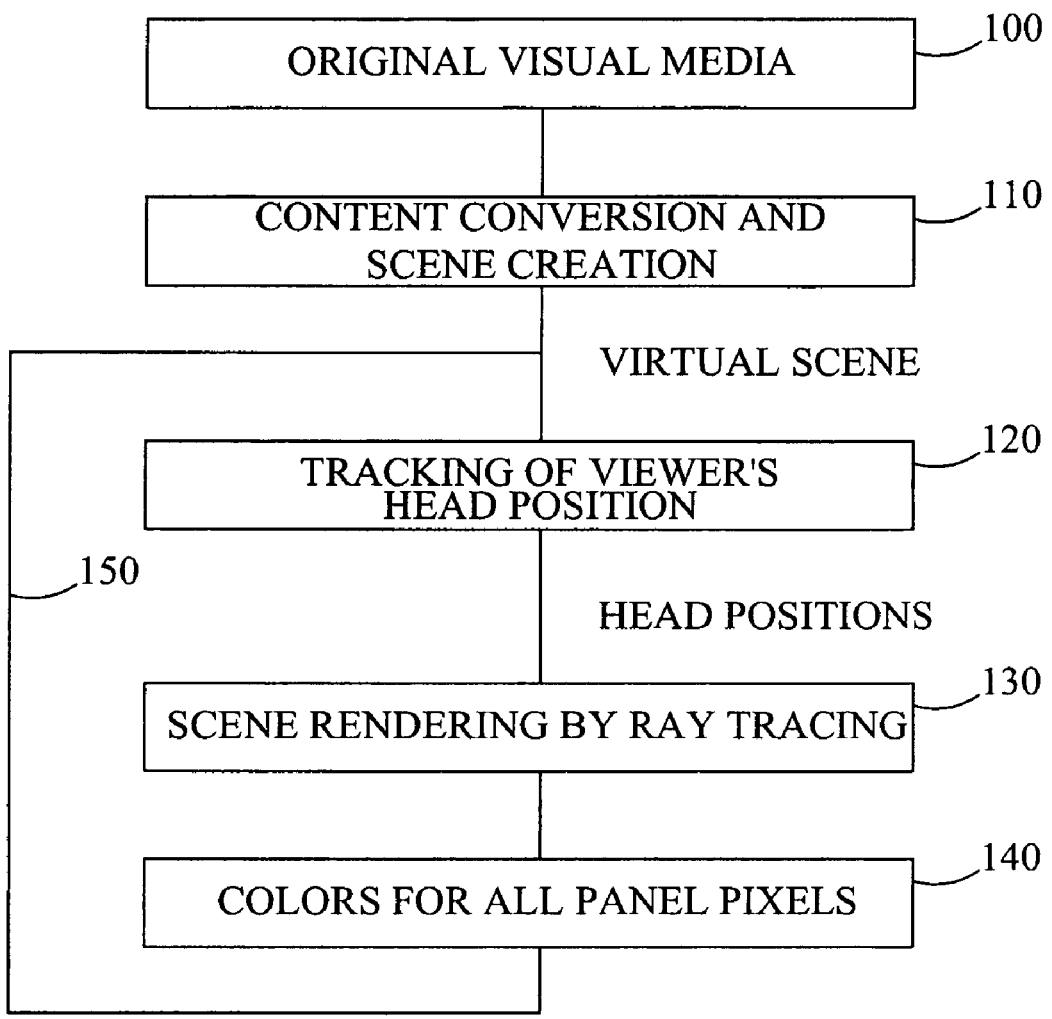
FIG. 2 illustrates an overview of a virtual scene process.

The process of creating and rendering the virtual see-through scenes on a single or tiled display is shown in FIG. 2. The original visual media 100 is transformed for generating a 3D virtual scene behind the panels 110. Based on the tracked viewers' head positions 120, a ray tracing 130 based rendering process computes the color for each pixel on the panels 140. When the viewers move, the tracked eye positions are updated 150 and the images displayed on the panels are changed accordingly in real time. This tracking and rendering process continues as long as there are viewers in front of the display system.

Figure 3:
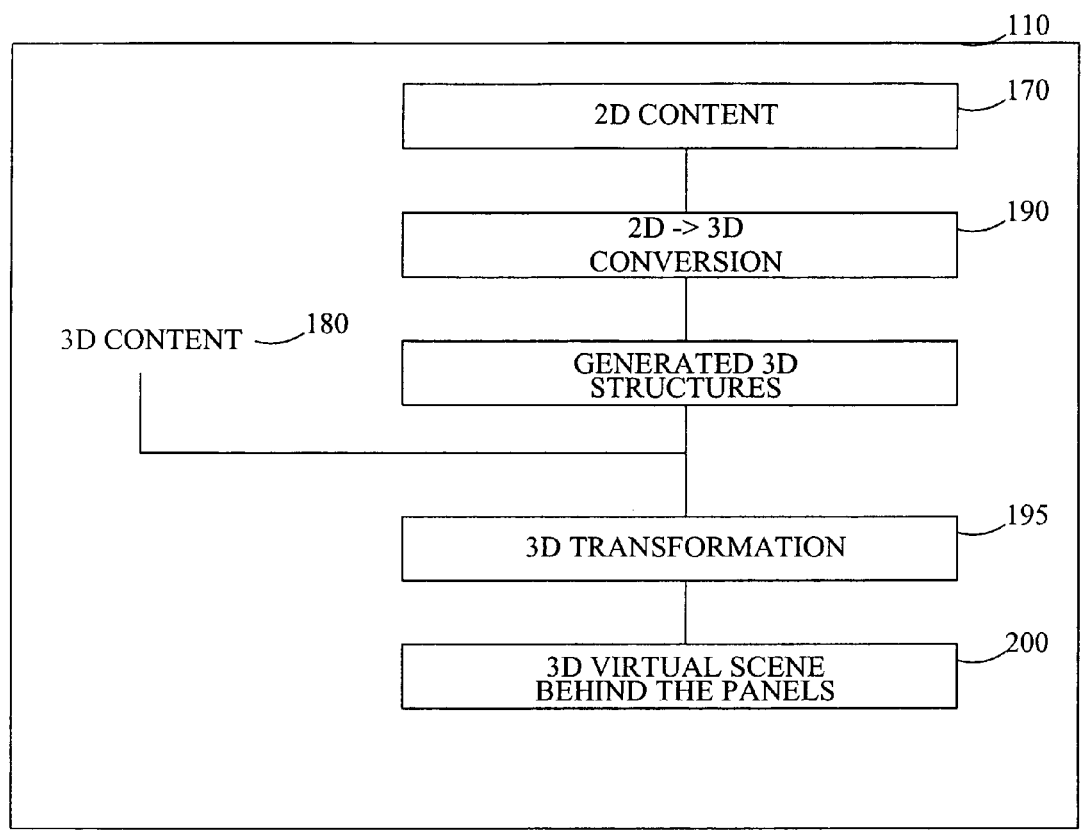
FIG. 3 illustrates creating a 3D virtual scene.

Referring to FIG. 3, in order to generate the see-through effect, a virtual scene may be created based on the original visual media, which may be 2D content 170 (images, videos, graphics, etc), 3D content 180 (graphics, scientific data, gaming environments, etc), or a combination thereof. As the 2D content does not inherently contain 3D information, a process 190 of converting 2D content into 3D structures may be used. Possible 3D structures include points, surfaces, solid objects, and the like. Then the 3D structure and content are further transformed 195 so that they lie in the field of view and appear consistent with real-life appearances. The transformation applied to the 3D structures includes one or the combination of 3D translation, rotation, and scaling. The process results in creating a 3D virtual scene behind the panels 200.

The 2D-to-3D conversion process can be generally classified into two different categories. The first category is content independent. The 2D-to-3D conversion is implemented by attaching 2D content to pre-defined 3D structures without analyzing the specific content. For example, a 2D text window can be placed on a planar surface behind the panels. Another example is that a 2D panoramic photo with extremely large horizontal size is preferably attached to a cylindrical 3D surface. In this case, all the image content is distant from the viewers and has passed the range where stereo or occlusion effects can occur. These conversion steps are pre-defined for all kinds of 2D media and do not depend on the specific content.

The second category is content dependent. The 2D visual media is analyzed and converted to 3D by computer vision and graphics techniques. For example, a statistical model learned from a large set of images can be utilized to construct a rough 3D environment with different depth layers from a single 2D image. There also exist semi-automatic 2D-to-3D conversion methods that combine the automatic conversion techniques with human interaction.

Figure 4A:
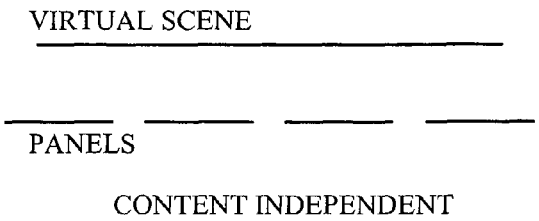
FIGS. 4A and 4B illustrate building a 3D virtual scene from 2D media.
Figure 4B:
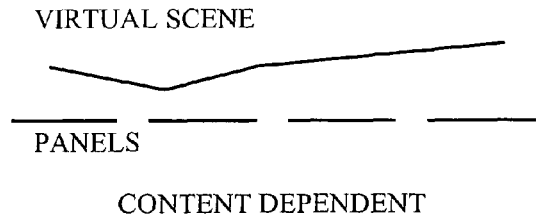

FIG. 4 illustrates two examples of converting a 2D image to 3D structures. The left sub-figure is generated by content-independent conversion that simply attaches the 2D image to a planar surface behind the panels. In contrast, the right sub-figure demonstrates the result by content-dependent conversion, which consists of three different depth layers. When the viewers move their heads, they will observe motion parallax and varying image perspectives in the scene, which increase the sense of depth and immersion.

The converted 3D structure or original 3D content is further transformed in the 3D space so that it lies in the virtually visible area behind the panels and generates real-life appearances. Possible 3D transformations include scaling, translation, rotation, etc. For example, the virtual scene may be scaled such that the rendered human bodies are stretched to real-life sizes. After the transformation, the 3D structures are placed behind the panels and become ready for scene rendering.

After the virtual scene is created, the scene will be rendered for the viewer(s) in front of the display. In order to generate the sense of immersion and see-through experience, it is preferable to render the scene so that the light rays virtually emerging from the scene converge at the viewers' eyes. When the viewers move, the scene is rendered to converge at the new eye positions in real time. In this manner, the viewers will feel that they are watching the outside world, while the panels serve as "virtual windows".

As there may be more than one viewer in front of the display, it is not always preferred to make the scene converge at a single viewer. Instead, a 3D point, called focus point, may be defined as a virtual viewpoint in front of the display. All the optical rays are assumed to originate from the virtual scene and converge at the focus point, as shown in FIG. 5.

Figure 5A:
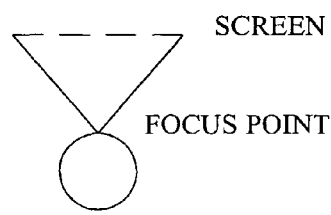
FIGS. 5A-5D illustrates choosing focus point for single and multiple viewers.
Figure 5B:
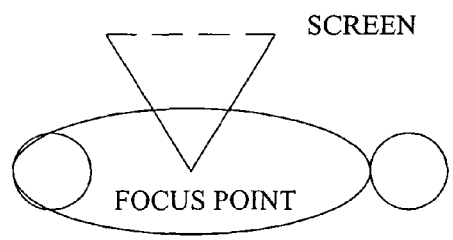
Figure 5C:
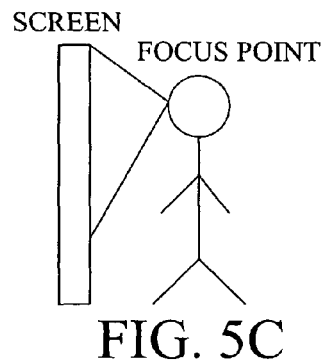
Figure 5D:
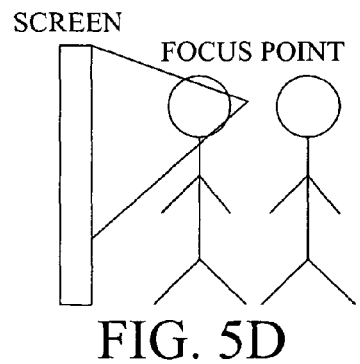

The focus point is estimated based on the eye positions of all (or a plurality of) the viewers. If there is a single viewer, this focus point may be defined as the center of the viewer's eyes (FIGS. 5(a) and 5(c)). If there are multiple viewers, the focus point may be determined by various techniques. One embodiment is to select the centroid of the 3D ellipsoid that contains the eye positions of all viewers, by assuming that all viewers are equally important, as shown in FIGS. 5(b) and 5(d). Another embodiment is to select the eye position of the viewer closest to the display as the focus point.

In the case of multiple viewers, the selected focus point may be deviated from the eye positions of one or more viewers. Our display systems will not be influenced by this deviation, as the display generates the see-through experience by rendering the same monocular view for both eyes. Consequently, the display system allows the viewers to move freely in front of the display without reducing the qualities of rendered scenes. In contrast, the stereoscopic displays generate binocular views for different eyes. The image quality of stereoscopic displays is largely influenced by how much the focus point is deviated from a number of pre-defined regions, called "sweet spots".

Figure 6:
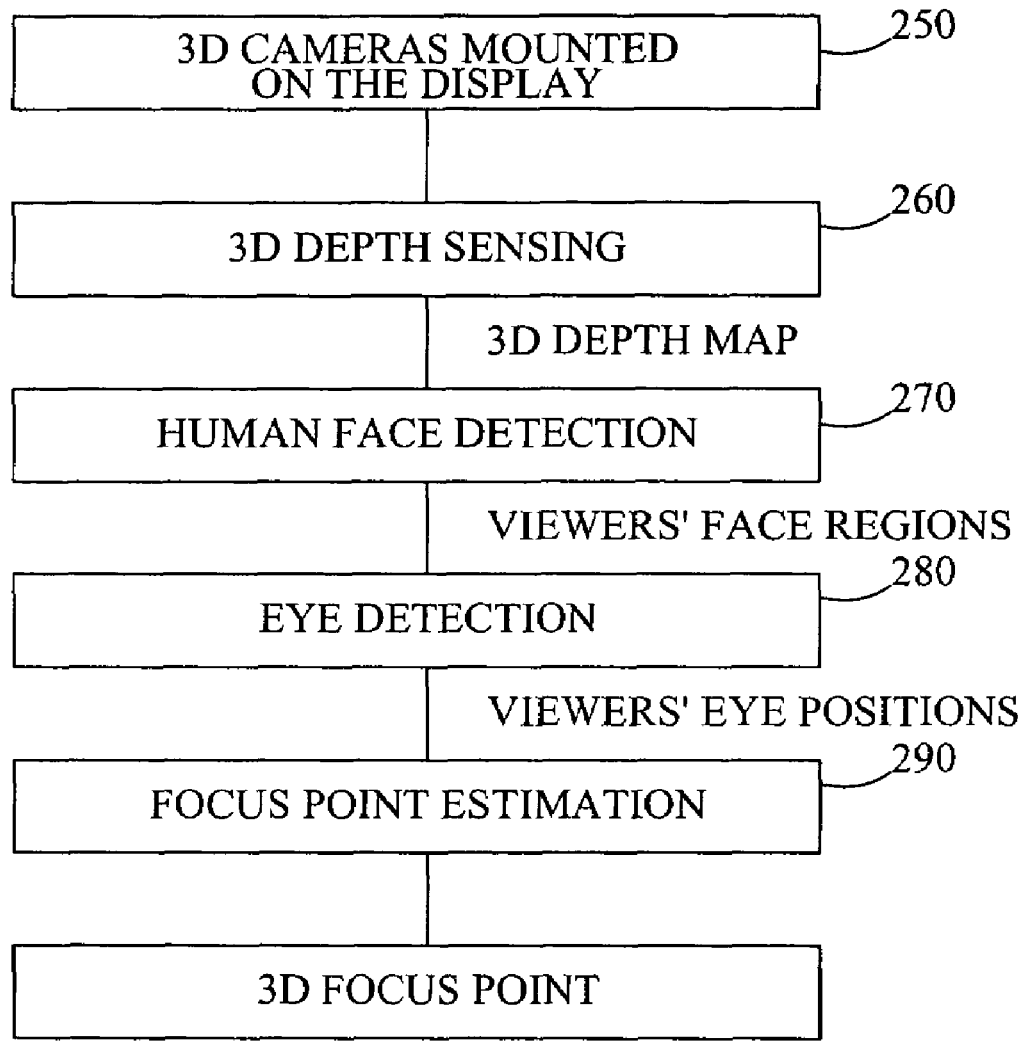
FIG. 6 illustrates a viewer tracking process.

The process of tracking viewers and estimating focus point is shown in FIG. 6. One or more cameras 250 are mounted on the boundary of the display system (or integrated with the display) in order to track the viewers in 3D space. One embodiment utilizes a single 3D depth camera 260 that projects infra-red lights to the space in front of the display and measures the distance to the scene objects based on the reflected light. This depth camera is able to generate 3D depth maps in real time, and is not substantially influenced by the lighting conditions of the viewing environment.

Another embodiment utilizes a stereo pair of cameras to obtain the 3D depth map 260 in real time. The pair of cameras observes the scene from slightly different viewpoints. A depth map is computed by matching the image pairs captured from both cameras at the same time. The stereo camera pair typically generates more accurate depth map than 3D depth cameras, and yet is more likely to be influenced by the lighting conditions of the viewing environment.

The estimated 3D depth maps are further analyzed by detecting and tracking viewers' eye positions. The viewers' face regions 270 are extracted from the depth map by face detection techniques. Then the eye positions 280 are estimated by matching the central portion of human face regions with eye templates.

The focus point 290 is computed based on the eye positions of all viewers. Suppose there are N(>1) viewers in front of the display. Let $P_i$ denote the center of eye positions of the i-th viewer in the 3D space. Then the focus point, denoted by $P_0$, is computed from all the eye center positions. In a preferred embodiment, the focus point is determined as the centroid of all the eye centers as follows, $$P_0 = \frac{1}{N}\sum_{i=1}^{N} P_i$$

Based on the created virtual scene and the estimated focus point, the rendering process may be implemented by interactive ray tracing techniques. A large number of 3D optical rays are assumed to originate from the points in the virtual scene and converge at the focus point. The pixels on the panels are indeed the intersection of these rays with the flat panels.

The preferred ray tracing technique is described as follows. For a pixel on the flat panel, with its 2D coordinate denoted by p(u, v), its physical position in the 3D space, denoted by P(x, y, z), can be uniquely determined. The correspondence between 2D pixel coordinates and 3D point positions is made possible by geometric shape calibration of the panels. Then a 3D ray, denoted by $\vec{PP_0}$, is formed by connecting $P_0$ to P. This ray is projected from the virtual scene behind the panels towards the focus point $P_0$, through the point on the panel P. It is assumed that the optical ray is originated from a point in the 3D virtual scene, denoted by $P_x$. This scene point can be found by tracing back the optical ray until it intersects with the 3D geometric structures in the scene. This is why the process is called "ray tracing".

Figure 7A:
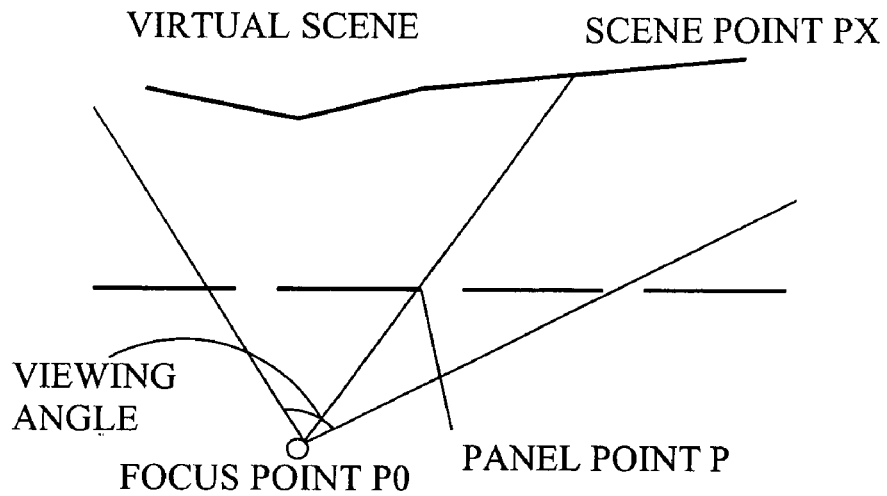
FIGS. 7A and 7B illustrate a ray tracking process based on a changed focus point.
Figure 7B:
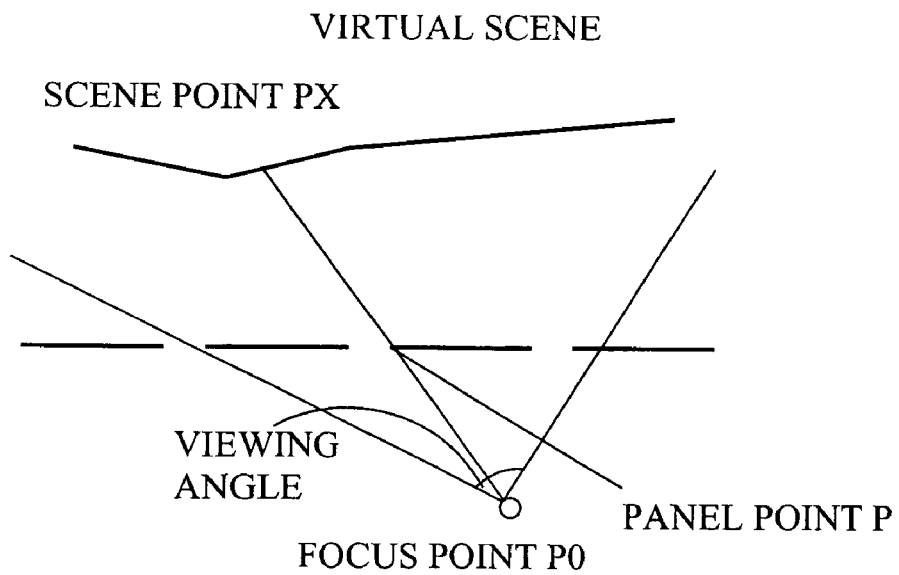

The scenario of ray tracing is illustrated in FIG. 7. Although only one ray is shown, the process generates a large number of rays for all the pixels on every panel. Each ray starts from the scene point $P_x$, passes through the panel point P, and converges at the focus point $P_0$. Once the focus point is changed to a new position, the rays are also changed to converge at the new position.

FIG. 7 illustrates, that when the focus point changes, the viewers will see different parts of scene and the rendered images will be changed accordingly. By comparing two sub-figures (a) and (b), one can observe that the scene structures seen by the viewers are different, even though the scene itself and display panels remain the same. In each sub-figure, the field of view is marked by two dashed lines and the viewing angle is indicated by a curve.

Besides observing different parts of the scene, the viewers will also see the relative motion between themselves and the scene when they move. With the panels as a static reference layer, the virtual scene appears to move behind the panels in the opposite direction to that of the viewer. Furthermore, the viewers will also observe the motion parallax induced by different depth layers in the 3D scene. If the depth layers are not parallel to the panels, viewers will also observe the changing perspective effects when they move. Also, the monocular view may be rendered in ultra-high image resolution, wide viewing angles, and real-life appearances. All these factors will greatly improve the see-through experiences and increase the sense of immersion and depth for the viewers.

Once the scene point is found by the ray tracing process, each pixel is assigned a color obtained by sampling the color or texture on the surface which the scene point lie on. One embodiment is to interpolate the color within a small surface patch around the scene point. Another embodiment is to average the color values of the adjacent scene points. The color values generated by the first embodiment tend to be more accurate than that by the second one. However, the second embodiment is more computationally efficient than the first one.

Figure 8:
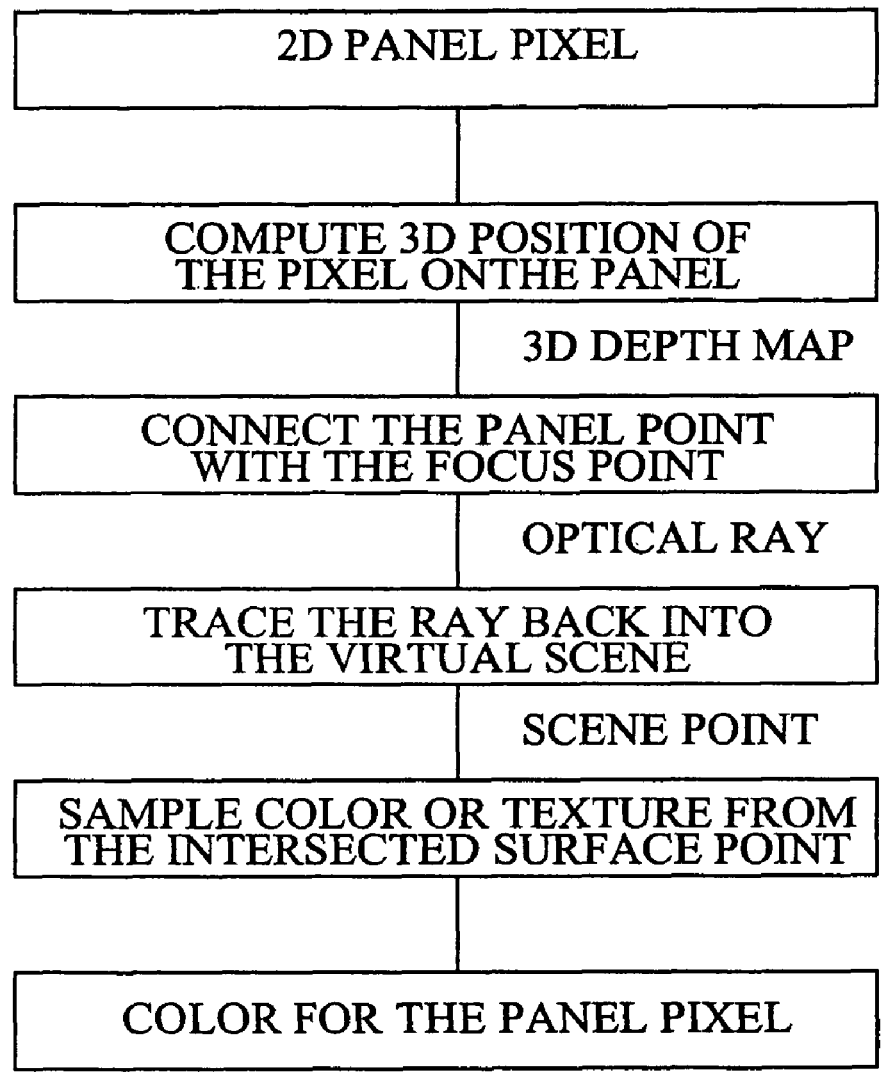
FIG. 8 illustrates a ray tracking process for each pixel on the panels.

The overall ray tracing technique is summarized in FIG. 8. Although the pixel positions are different, the ray tracing process is the same and can be computed in parallel. Therefore, the ray tracing process for all pixels can be divided into independent sub-tasks for single pixels, executed by parallel processing units in the multi-core CPU and GPU clusters. In this manner, the rendering speed can be greatly accelerated for real-time interactive applications.

Due to the high cost of large-size flat panels, it is more economic to integrate an array of smaller panels to build a tiled display system for generating the same see-through experience. Conventional tiled display system requires all the flat panels to be aligned in a single plane. In this planar configuration, the visual media is physically attached to each flat panel, and is therefore restricted in this plane. When a panel is moved or rotated, the view of the whole display is distorted. Furthermore, the conventional tiled display systems apply the same display parameters (e.g. brightness and color) to all the panels. If the display setting of one panel is changed, the whole view is also disturbed.

The scene rendering process allows the separation between the scene and the flat panels. Therefore, there exists considerable flexibility in the configuration of the panels, while the rendered see-through experience is not affected or even improved. Although the shape of each panel cannot be changed, the geometric shapes of the whole tiled display can be changed by moving and rotating the panels. The display parameters, including brightness and color, can be changed for each panel independently. The flexibility in geometric shapes and display parameters enables the tiled display system to adapt to different viewing environments, viewers' movements and controls, and different kinds of visual media. This flexibility is also one of the advantages of the tile display over a single large panel. Such flexibility could also be offered by single or multiple unit flexible displays.

Figure 9:
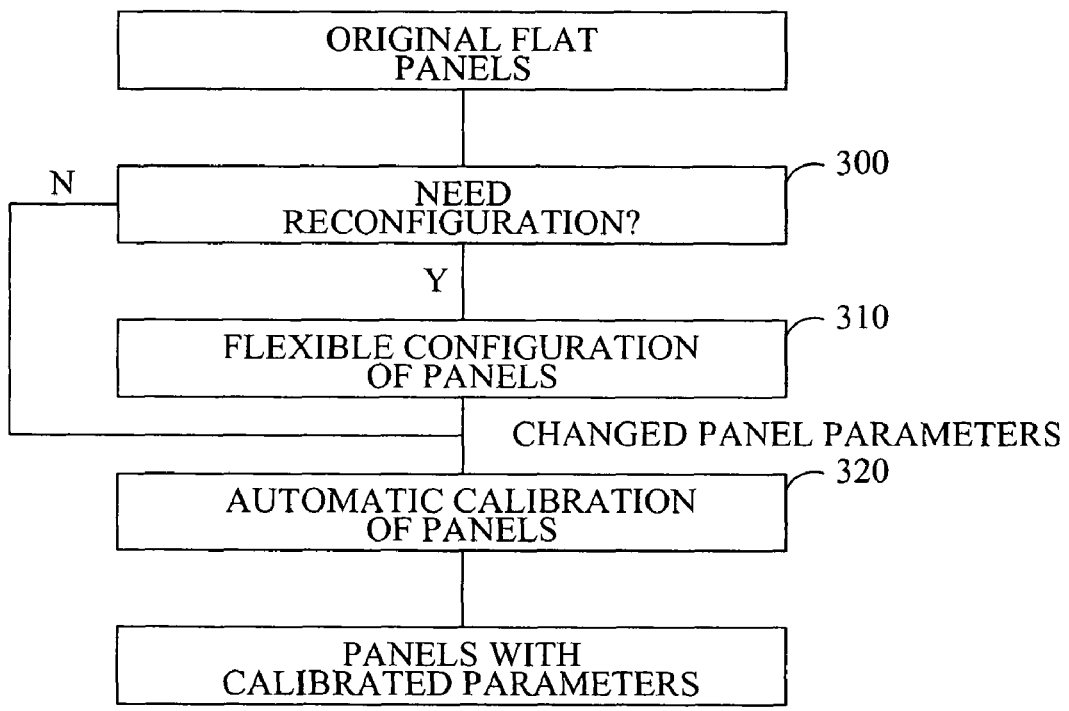
FIG. 9 illustrates an overview of the panel process.

The geometric shapes and display parameters changed by the configuration are compensated for by an automatic calibration process, so that the rendering of virtual see-through scenes is not affected. This panel configuration and calibration process is illustrated in FIG. 9. If a panel re-configuration is needed 300, the geometric shape and display parameters of the tiled display have changed 310. Then an automatic calibration process 320 is executed to correct the changed parameters. This calibration process takes only a short time to execute and is performed only once, after a new panel configuration is done.

Although the flat shape of each panel is not readily changed, the tiled display can be configured in various geometric shapes by moving and rotating the panels. Besides the traditional planar shape, different shapes can allow the tiled display to adapt to different viewing environments, various kinds of visual media, and viewers' movements and control.

As shown in FIG. 10, the tiled display can be configured in a traditional flat (in (FIG. 10a)), concave (in FIG. 10(b)), or convex shape (in FIG. 10(c)). In the case of curved (concave or convex) shapes, more panels pixels are needed to cover the same field of view. In other words, the tiled display in curved shapes requires either adding more panels or increasing the size of each panel. For the same field of view, the tiled display in curved shapes can render more visual media due to the increased number of pixels, as shown in (b) and (c).

One direct application of the curved shapes is to render the wide-screen images or videos on the tiled display without resizing the image. In the context of frame format conversion, resizing the image from a wider format to a narrower format, or vice versa, will introduce distortion and artifacts to the images, and also require much computation power. Due to the separation between the panels and the scene behind them, scene rendering is done by the same ray tracing process, without resizing the images. Furthermore, as the viewers get closer to the image boundaries, they may gain a stronger sense of immersion.

FIG. 11 shows the scenario of rendering wide-screen content on a concave shaped tiled display, where the wide-screen content is placed behind the panels. The aspect ratio of rendered images is increased by the concave shape, e.g. from the normal-screen 4:3 (or equivalently 12:9) to the wide-screen 16:9. Depending on the aspect ratio of the content, the tiled display can be re-configured to various concave shapes. For example, the curvature of the display can be increased in order to show the wide-screen films in the 2.35:1 format.

The geometric shape of tiled display can be also re-configured to fit the viewing environment. The extreme cases are that the tiled display is placed in a room corner between different walls. FIG. 12 shows that the tiled display is placed in an "L" shape around a room corner in (a) and in a "U" shape across three walls in (b), with the angles between panels being 90 degree. The display is better fitted to the viewing environment and reduces the occupied space. Furthermore, this shape also helps increase the sense of immersion and 3D depth. Furthermore, additional panels can be added to the tile while existing panels can be removed, followed by the calibration step.

Figure 13:
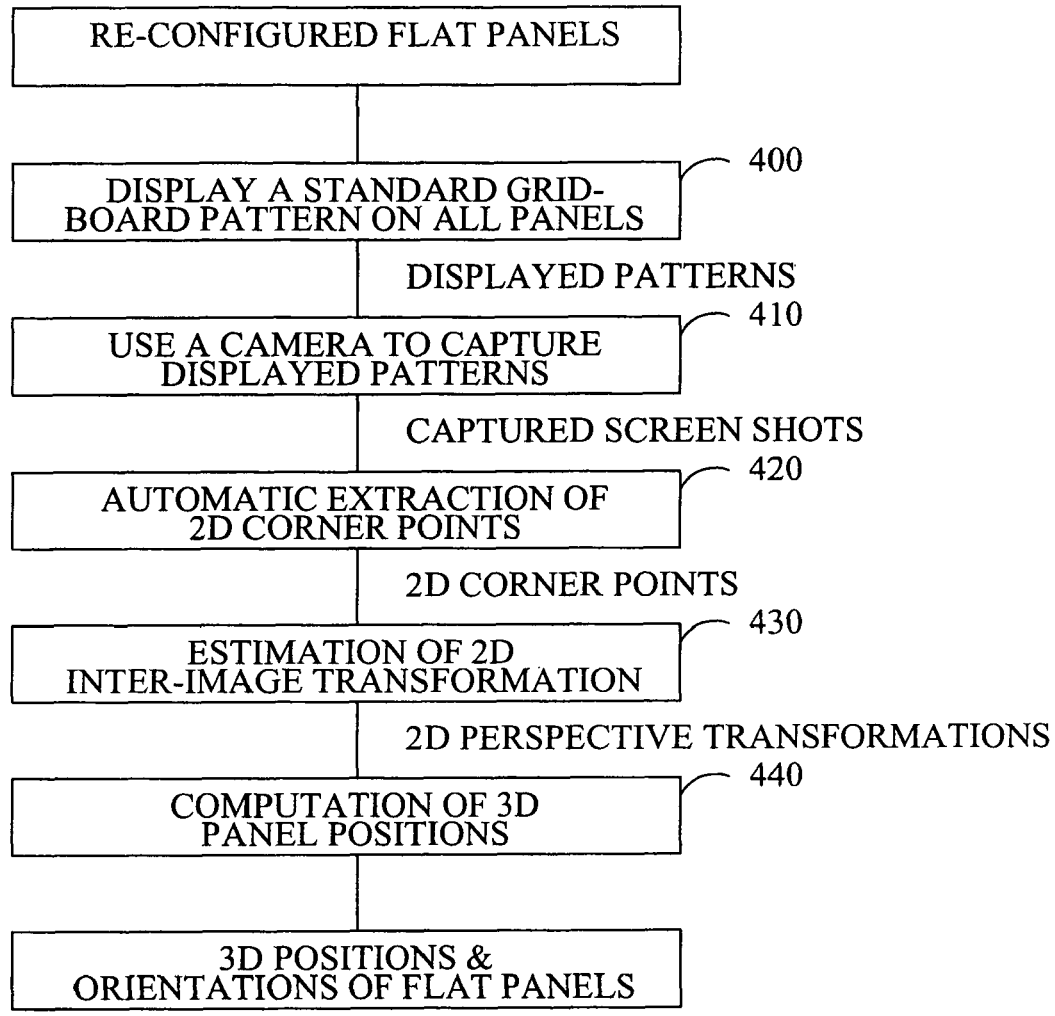
FIG. 13 illustrates geometric shape calibration for the tiled display.

The goal of calibration is to estimate the position and orientation of each panel in the 3D space, which are used by the scene creation and rendering process. A preferred embodiment of the geometric calibration process utilizes a calibration process that employs one camera in front of the display to observe all the panels. For better viewing experience, the camera can be placed in the focus point if it is known. The calibration method is illustrated in FIG. 13. First, a standard grid pattern, e.g. checkerboard, is displayed on each flat panel 400. Then the camera captures the displayed pattern images from all the panels 410. In each captured image, a number of corner points on the grid pattern are automatically extracted 420 and corresponded across panels. As the corners points are assumed to correspond to the 3D points lying on the same planar surface in 3D space, there exists a 2D perspective transformation that relates these corner points projected on different panels 420. The 2D inter-image transformation, namely perspective transformation, can be computed between any pair of panels from at least four pairs of corner points. The 3D positions and orientation of panels 440 are then estimated based on the set of 2D perspective transformations.

As each flat panel has its own independent display settings, there exists significant flexibility in the display parameters of the tiled display. The display parameters include, for example, the maximum brightness level, contrast ratio, gamma correction, and so on. As the viewers may freely change the geometric shapes and display settings of the tiled display, the displayed parameters need to be calibrated to generate the same see-through experience.

The tiled display in the traditional planar shape can calibrated relatively easily. All the flat panels can be reset to the same default display setting which may complete the calibration task for most cases. If there still exists inconsistency in the brightness, contrast, colors, and so on between the panels, calibration methods are applied to correct these display parameters.

For the tiled display in non-planar shapes, however, the calibration of display parameters becomes more difficult. It is known that the displayed colors on the panels will be perceived differently by the viewers from a different viewing angle, due to the limitations of manufacturing and displaying techniques for flat panels. This is known as the effect of different viewing angles on the display tone scale. The case of using multiple panels is more complicated. As the panels may not lie in the same plane, the relative viewing angles between the viewers and each panel may always be different. Even if the display setting of every panel is the same, the perceived colors on different panels are not consistent. In other words, the tiled display in non-planar shapes is very likely to generate inconsistent colors if no calibration of display parameters is done. Therefore, the calibration of the display parameters becomes ultimately necessary for the tiled display in non-planar shapes.

Figure 14:
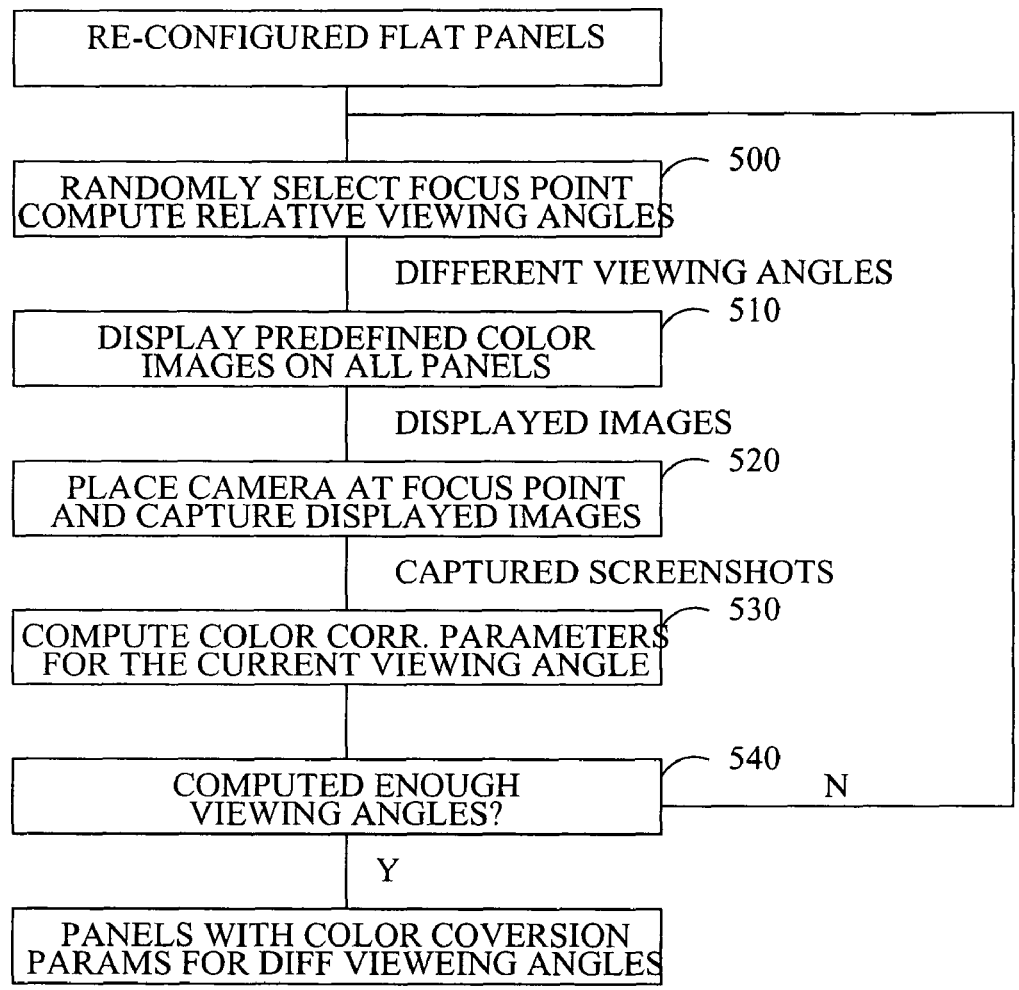
FIG. 14 illustrates calibration of display parameters for the tiled display.

A preferred embodiment of display parameter calibration focuses particularly on correcting the colors displayed on the tiled display from different viewing angles, as shown in FIG. 14. The color correction method aims at compensating for the difference in the color perception due to different geometric shape of the tiled display. Instead of making physical modification to the panels, the calibration process generates a set of color correction parameters for each panel, which can easily be applied to the rendered image in real time.

A focus point is defined as the virtual viewpoint for all the viewers in front of the display. When the viewers move, this focus point also changes. The relative viewing angle between the eye sights started from the focus point and each panel is computed. In order to allow the viewers to move freely in the 3D space in front of the display, the calibration process randomly selects a large number of focus points 500 in front of the display and applies the same color correction method to each of these points.

A color correction method, similarly to the one described in FIG. 14, is applied for panel calibration. First, a predefined color testing image 510 is displayed on each panel. The color testing image may contain multiple color bars, texture regions, text area, and other patterns. A camera 520 is placed in the focus point to capture the displayed images. Then the color characteristics 530, such as gamma curves, are computed from both the predefined image and the captured image. The difference between color characteristics are corrected by a number of color correction parameters, including a color look-up table and the coefficients of color conversion matrices. These color correction parameters are specifically determined for the current relative viewing angle for each panel.

The same color correction technique is repeated 540 with randomly selected focus points until enough viewing angles have been tested for each panel. Then each panel stores a set of color conversion parameters, each of which is computed for a specific viewing angle. The panels can determine the color conversion parameters according to the relative viewing angle and correct the color images in real time. The viewers can move freely in front of the display and observe the rendered scenes with consistent colors.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for displaying an image on a display comprising:
   (a) providing said display for displaying an image thereon, said display comprising a plurality of panels selectively moveable with respect to each other by a viewer, each panel comprising an array of a plurality of image-displaying pixels;
   (b) providing a three dimensional representation of an image;
   (c) rendering said three dimensional representation as a two dimensional representation on said display by distributing among said plurality of panels respectively different and substantially non-overlapping spatial portions of said image;
   (d) providing an imaging device associated with said display;
   (e) determining the location of a viewer with respect to said display;
   (f) modifying said rendering on said display based upon said determining the location of said viewer with respect to said display.

2. The method of claim 1 wherein said modifying results in said viewer observing two dimensional motion parallax.

3. The method of claim 1 wherein said three dimensional representation is generated from the input of a two dimensional representation.

4. The method of claim 3 wherein said three dimensional representation is created from said two dimensional representation based upon a visual media content independent technique.

5. The method of claim 3 wherein said three dimensional representation is created from said two dimensional representation based upon a visual media content dependent technique.

6. The method of claim 1 wherein said modifying is based upon the viewer's head position.

7. The method of claim 6 wherein said modifying is based upon the viewer's eye position.

8. The method of claim 6 wherein said modifying is based upon the viewer's gaze.

9. The method of claim 1 wherein said rendering is based upon the convergence of a plurality of optical rays.

10. The method of claim 1 wherein the color and luminance of said two dimensional representation is based upon the color and luminance of said three dimensional representation.

11. The display of claim 1 wherein said display is flat.

12. The display of claim 1 wherein said display is not flat.

13. The display of claim 1 wherein said display is convex.

14. The display of claim 1 wherein each of said plurality of panels are flat.

15. The display of claim 1 wherein the color of said two dimensional representation is based upon tracing optical rays into said three dimensional representation and sampling colors from said three dimensional representation.

16. The display of claim 1 wherein said display includes a plurality of panels and each of said panels are calibrated.

17. The display of claim 16 wherein said calibration for each of said panels is independent of another of said panels.

18. The display of claim 16 wherein said calibration includes brightness and color.

19. The display of claim 1 wherein said panels are at an angle between zero and 180 degrees with respect to one another.

20. The display of claim 1 wherein said determining said location is based upon a plurality of viewers.

21. The display of claim 1 wherein said display is concave.

* * * * *